United States Patent
Lee

(10) Patent No.: US 12,454,181 B2
(45) Date of Patent: Oct. 28, 2025

(54) BATTERY MANAGEMENT METHOD AND BATTERY SYSTEM USING THE SAME INCLUDING A PLURALITY OF SLAVE BATTERY MANAGEMENT SYSTEMS AND A MASTER BATTERY MANAGEMENT SYSTEM

(71) Applicant: LG ENERGY SOLUTION, LTD., Seoul (KR)

(72) Inventor: Bokyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 643 days.

(21) Appl. No.: 17/799,780

(22) PCT Filed: Nov. 1, 2021

(86) PCT No.: PCT/KR2021/015529
§ 371 (c)(1),
(2) Date: Aug. 15, 2022

(87) PCT Pub. No.: WO2022/098012
PCT Pub. Date: May 12, 2022

(65) Prior Publication Data
US 2023/0097997 A1 Mar. 30, 2023

(30) Foreign Application Priority Data
Nov. 5, 2020 (KR) .......... 10-2020-0146744

(51) Int. Cl.
*H01M 10/44* (2006.01)
*B60L 3/00* (2019.01)
(Continued)

(52) U.S. Cl.
CPC ........ *B60L 3/0046* (2013.01); *H02J 7/00032* (2020.01); *H02J 7/00308* (2020.01); *H04W 24/08* (2013.01)

(58) Field of Classification Search
CPC .. H02J 7/00032; H02J 7/0042; H02J 7/00308; B60L 58/14; B60L 2240/62;
(Continued)

(56) References Cited

U.S. PATENT DOCUMENTS 10,249,912 B1 * 4/2019 Godo .................. H01M 10/482
2012/0053771 A1 3/2012 Yoshida
(Continued)

FOREIGN PATENT DOCUMENTS

EP 3 637 577 A1 4/2020
JP 2012-50299 A 3/2012
(Continued)

OTHER PUBLICATIONS

International Search Report (PCT/ISA/210) issued in PCT/KR2021/015529, dated Feb. 15, 2022.

*Primary Examiner* — Edward Tso
(74) *Attorney, Agent, or Firm* — Birch, Stewart, Kolasch & Birch, LLP

(57) ABSTRACT

A management method of a battery system includes determining whether a wireless communication failure occurs between a master battery management system (BMS) and at least one of a plurality of slave battery management systems (BMSs); receiving road condition information of where the vehicle equipped with the battery system is currently positioned if the wireless communication failure occurs; determining whether the vehicle is on the road based on the road condition information; setting a first failure confirmation time if the current position of the vehicle is on the road; setting a second failure confirmation time if the current
(Continued)

position of the vehicle is not located on the road; and entering a safety mode if a wireless communication failure section from the time when the wireless communication failure occurs to the current time reaches the first failure confirmation time or the second failure confirmation time.

17 Claims, 3 Drawing Sheets

(51) Int. Cl.
    *H01M 10/46*     (2006.01)
    *H02J 7/00*     (2006.01)
    *H04W 24/08*     (2009.01)

(58) Field of Classification Search
    CPC .......... B60L 2240/645; B60L 2240/80; B60L 58/18; H01M 2010/4278; H01M 2010/4271; H01M 10/4207
    USPC .................. 320/104, 109, 116, 118, 119
    See application file for complete search history.

(56) References Cited

U.S. PATENT DOCUMENTS

| | | |
|---|---|---|
| 2015/0120129 A1 | 4/2015 | Lee |
| 2016/0223616 A1 | 8/2016 | Yoshino et al. |
| 2016/0229309 A1 | 8/2016 | Mitsutani |
| 2016/0325626 A1 | 11/2016 | Honda et al. |
| 2018/0012484 A1 | 1/2018 | Sakabe et al. |
| 2018/0236894 A1 | 8/2018 | Bandai et al. |
| 2019/0036174 A1 | 1/2019 | Katrak et al. |
| 2020/0083730 A1 | 3/2020 | Dan et al. |
| 2020/0106278 A1 | 4/2020 | Sung et al. |
| 2020/0293042 A1* | 9/2020 | Sakurada ............ G05D 1/0293 |
| 2020/0296334 A1* | 9/2020 | Sakurada ............ H04N 7/181 |
| 2021/0265670 A1 | 8/2021 | Choi et al. |
| 2023/0198030 A1 | 6/2023 | Sung et al. |

FOREIGN PATENT DOCUMENTS

| | | |
|---|---|---|
| JP | 2016-143113 A | 8/2016 |
| JP | 2016-143593 A | 8/2016 |
| JP | 2016-147517 A | 8/2016 |
| JP | 5987636 B2 | 9/2016 |
| JP | 2018-41701 A | 3/2018 |
| JP | 2018-137900 A | 8/2018 |
| JP | 2019-28822 A | 2/2019 |
| JP | 2019-536215 A | 12/2019 |
| KR | 10-2008-0053561 A | 6/2008 |
| KR | 10-1849357 B1 | 4/2018 |
| KR | 10-2019-0013647 A | 2/2019 |
| KR | 10-2020-0010053 A | 1/2020 |
| KR | 10-2020-0098071 A | 8/2020 |
| KR | 102180138 B1 * | 11/2020 |
| WO | WO 2015/121979 A1 | 8/2015 |

* cited by examiner

BATTERY MANAGEMENT METHOD AND BATTERY SYSTEM USING THE SAME INCLUDING A PLURALITY OF SLAVE BATTERY MANAGEMENT SYSTEMS AND A MASTER BATTERY MANAGEMENT SYSTEM

CROSS-REFERENCE TO RELATED APPLICATION

This application claims priority to and the benefit of Korean Patent Application No. 10-2020-0146744 filed in the Korean Intellectual Property Office on Nov. 5, 2020, the entire contents of which are incorporated herein by reference.

The present disclosure relates to a battery management method and a battery system using the same.

BACKGROUND ART

In a wireless battery management system (BMS), a master BMS and a slave BMS transmit and receive data through wireless communication such as radio frequency (RF) communication. Compared to a conventional method in which the master BMS and the slave BMS transmit and receive the data via a wire, the number of communication failures increases, while a restoration rate at which the communication failures are restored to normal is high.

In the conventional wired method, if the communication failure occurs between the slave BMS and the master BMS, which monitor the cell voltage, it is difficult to restore the communication failure to normal. In the communication failure state, since the master BMS cannot know the cell voltage, the master BMS enters a safety mode that opens a relay in order to block the battery system to an external connection within a short time after the communication failure occurs.

However, even in the wireless method as in the conventional wired method, if the master BMS enters the safety mode whenever the communication failure occurs, the stability and marketability of the battery system deteriorates due to the frequent relay opening.

DISCLOSURE

Technical Problem

An object of the present invention is to provide a battery management method and a battery system that can reliably diagnose whether a wireless communication failure occurs in a wireless method.

Technical Solution

A management method of a battery system including a plurality of battery packs, a plurality of slave battery management systems (BMSs), and a master battery management system (BMS) connected to the slave BMSs by wireless communication according to the present disclosure includes: determining whether a wireless communication failure occurs between a master BMS and at least one of a plurality of slave BMSs; receiving road condition information of which a vehicle equipped with the battery system is currently positioned if the wireless communication failure occurs; determining whether the vehicle is on a road capable of causing a cell overvoltage/low voltage based on the road condition information; setting a first failure confirmation time if the current position of the vehicle is on the road capable of causing the cell overvoltage/low voltage; setting a second failure confirmation time if the current position of the vehicle is not located on the road capable of causing the cell overvoltage/low voltage; and entering a safety mode if a wireless communication failure section from the time when the wireless communication failure occurs to the current time reaches the first failure confirmation time or the second failure confirmation time, wherein the second failure confirmation time is longer than the first failure confirmation time.

The determining whether the vehicle is on the road capable of causing the cell overvoltage/low voltage based on the road condition information may include determining that the current position of the vehicle is on a road capable of causing the cell overvoltage/low voltage when the road condition information is any one of a high speed, an uphill road, and a downhill road.

The battery management method may further include deriving the wireless communication failure section from the time when the wireless communication failure occurs to the current time.

The battery management method may further include determining whether the wireless communication failure is maintained if the wireless communication failure section does not reach the first failure confirmation time when the current position of the vehicle is positioned on a road capable of causing the cell overvoltage/low voltage.

The battery management method may further include determining whether the wireless communication failure is maintained if the wireless communication failure section does not reach the second failure confirmation time when the current position of the vehicle is not on a road capable of causing the cell overvoltage/low voltage.

The battery management method may further include opening a relay between the vehicle and the battery system depending on the safety mode.

A battery system according to the present disclosure includes: a battery pack including a plurality of battery cells and slave battery management systems (BMSs); a master battery management system (BMS) connected to the slave BMSs by wireless communication; and at least one relay connected between the vehicle and the battery pack, wherein the master BMS is configured to, if a failure occurs in wireless communication with the slave BMSs, receive road condition information for where the vehicle is currently positioned, determine whether the vehicle is on a road capable of causing a cell overvoltage/low voltage based on the road condition information, set a first failure confirmation time if the current position of the vehicle is on the road capable of causing the cell overvoltage/low voltage, set a second failure confirmation time if the current position of the vehicle is not on the road capable of causing the cell overvoltage/low voltage, and enter a safety mode if a wireless communication failure section from the time when the wireless communication failure occurs to the current time reaches the first failure confirmation time or the second failure confirmation time, and the second failure confirmation time is longer than the first failure confirmation time.

The master BMS is configured to determine that the current position of the vehicle is on the road capable of causing the cell overvoltage/low voltage when the road condition information is any one of a high speed, an uphill, or a downhill.

The master BMS is configured to derive a wireless communication failure section from the time when the wireless communication failure occurs to the current time.

The master BMS is configured to determine whether the wireless communication failure is maintained if the wireless communication failure section does not reach the first failure confirmation time when the current position of the vehicle is on the road capable of causing the cell overvoltage/low voltage.

The master BMS is configured to determine whether the wireless communication failure is maintained if the wireless communication failure section does not reach the second failure confirmation time when the current position of the vehicle is not on the road capable of causing the cell overvoltage/low voltage.

The master BMS is configured to open the at least one relay based on the safety mode.

Advantageous Effects

The wireless method is to provide the battery management method and the battery system that may adjust the time for determining whether the failure occurs in consideration of the situation in which the battery system is used when the wireless communication failure occurs.

MODE FOR INVENTION

Figure 1:
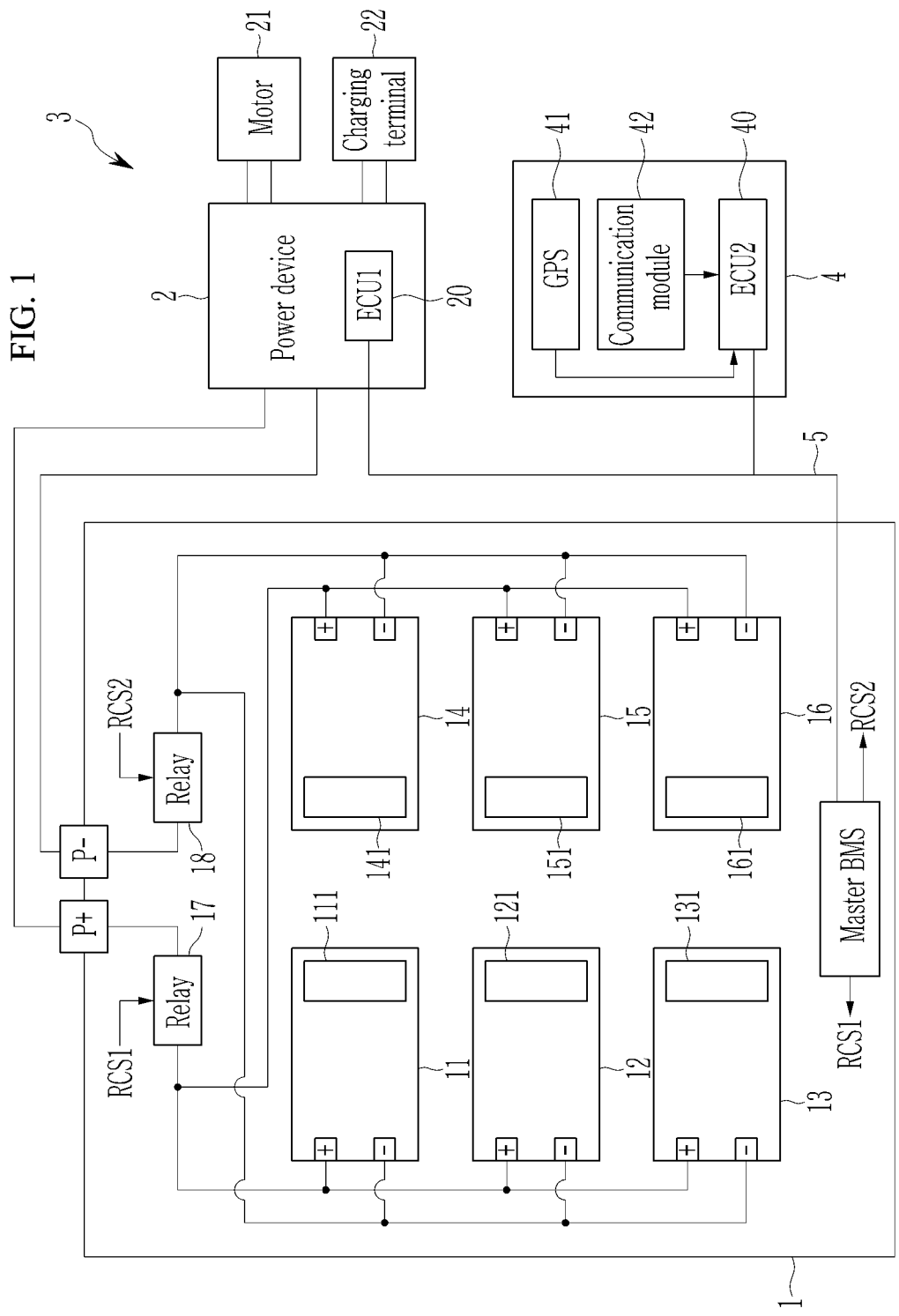
FIG. 1 is a view showing a battery system according to an exemplary embodiment and a vehicle equipped with the battery system.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to easily make a specification. Therefore, these terms do not have meanings or roles that distinguish them from each other in themselves. Further, in describing embodiments of the present specification, when it is determined that a detailed description of the well-known art associated with the present invention may obscure the gist of the present invention, it will be omitted. In addition, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 is a view showing a battery system according to an exemplary embodiment and a vehicle equipped with the battery system.

A power device 2 of a vehicle 3 is connected to two output terminals P+ and P− of a battery system 1. The vehicle 3 may be one of an electric vehicle, a hybrid vehicle, a plug-in hybrid vehicle, and the like, and the power device 2 receives power from the battery system 1 and supplies the power to a motor 21 or may receive the power from a charger connected to a charging terminal 22. When the power device 2 is connected to the charger through the charging terminal 22, the power of the charger may be converted into power suitable for the battery system 1 and supplied it to the battery system 1. The power device 2 includes an electronic control unit (ECU) (ECU1, 20) for controlling the power supply and a charging operation as described above.

The vehicle 3 further includes a navigation device 4 that detects a position of the vehicle, guides a path from a starting position to a destination, or displays traffic information at a current position. The navigation device 4 includes a satellite GPS 41 for determining the position of the vehicle 3, a communication module 42 for requesting and receiving information through wireless communication with a traffic information server, and an electronic control unit (ECU) (ECU2, 40) for controlling the operation of the navigation device 4.

In the battery system 1, six battery packs 11 to 16 are connected in parallel, the output terminal P+ of the battery system 1 is connected to each output terminal (+) of the battery packs 11 to 16 through a relay 17, and the output terminal P− is connected to each output terminal (−) of the battery packs 11 to 16 through a relay 18. One terminal of the relay 17 is connected to each output terminal (+) of the battery packs 11 to 16, the other terminal of the relay 17 is connected to the output terminal P+, one terminal of the relay 18 is connected to each output terminal (−) of the battery packs 11 to 16, and the other terminal of the relay 18 is connected to the output terminal P−.

As shown in FIG. 1, the battery system 1 includes slave battery management systems 111, 121, 131, 141, 151, and 161 of a plurality of battery packs 11 to 16, and a master battery management system 10 connected to the slave battery management systems 111, 121, 131, 141, 151, and 161 with wireless communication, and the two relays 17 and 18. Hereinafter, the slave battery management system is referred to as a slave BMS (Battery Management System), and the master battery management system is referred to as a master BMS.

The master BMS 10 generates relay control signals RCS1 and RCS2 to control the opening and closing of the relay 17 and the relay 18, and the relay 17 and the relay 18 are closed by the relay control signal RCS1 and RCS2 of an on-level.

Figure 2:
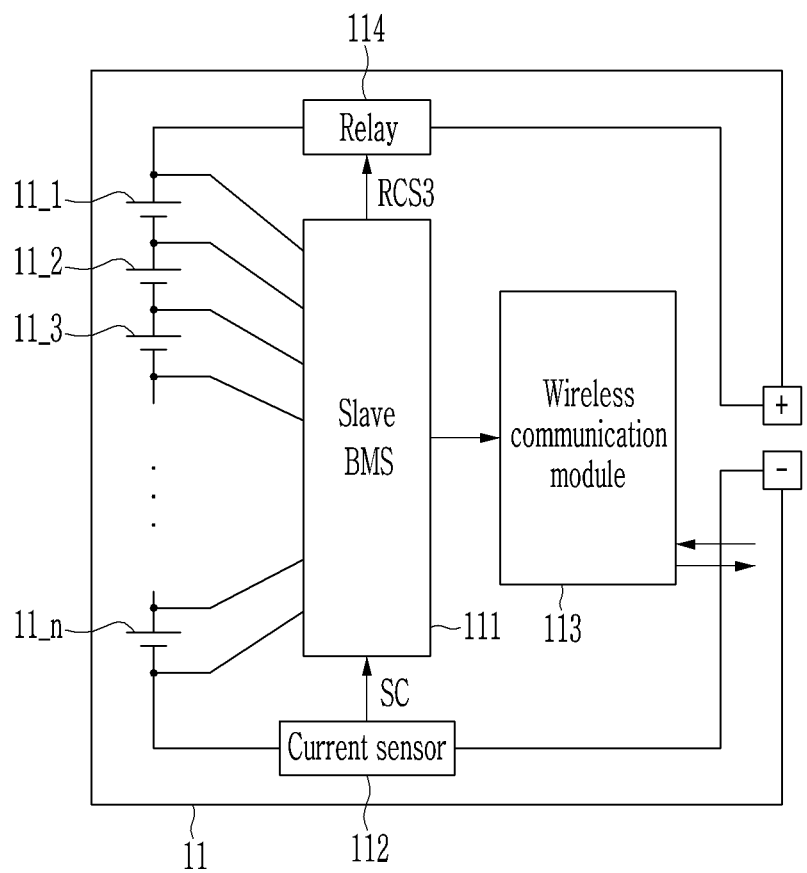
FIG. 2 is a view showing one among a plurality of battery packs shown in FIG. 1.

FIG. 2 is a view showing one among a plurality of battery packs shown in FIG. 1.

The structure of the battery pack 11 shown in FIG. 2 may be the same as that of the remaining battery packs 12 to 16.

As shown in FIG. 2, the battery pack 11 includes a plurality of battery cells 11_1 to 11_n (n is a natural number of 2 or more) connected in series, a slave BMS 111, a current sensor 112, a wireless communication module 113, and a relay 114.

The current sensor 112 may detect a current flowing through the battery pack 11 (hereinafter, a battery pack current) and transmit a current detection signal SC indicating the detected battery pack current to the slave BMS 111. In FIG. 2, the current sensor 112 is connected between the negative electrode of the battery pack 11 and the output terminal (−) of the battery pack 11, but unlike one shown in FIG. 1, it may be connected between the positive electrode of the battery 11 and the output terminal (+) of the battery pack 11.

The slave BMS 111 measures the cell voltage of a plurality of battery cells 11_1 to 11_n, and transmits information indicating the measured result to the master BMS 10 through the wireless communication module 113. The slave BMS 111 may measure the battery pack voltage of both terminal voltages of the battery pack 11, a temperature (hereinafter, a battery pack temperature) of the battery pack 11, and the like, and transmit a plurality of battery cell voltages along with at least one of the battery pack current, the battery pack voltage, and the temperature of the battery pack 11 to the master BMS 10 through the wireless communication module 113.

The relay 114 is connected between the output terminal (+) of the battery pack and the positive electrode of the battery pack 11, and is opened or closed according to the relay control signal RCS3 of the slave BMS 111. The relay 114 is closed according to the relay control signal RCS3 of the on level, and opened according to the relay control signal RCS3 of the off level.

Figure 3:
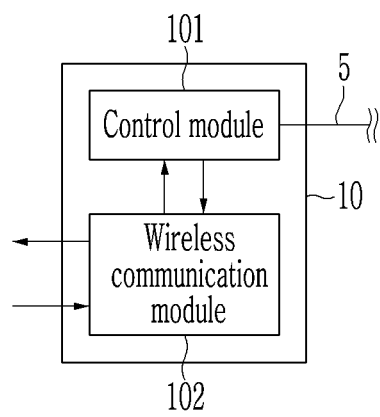
FIG. 3 is a view showing a master BMS according to an exemplary embodiment.

FIG. 3 is a view showing a master BMS according to an exemplary embodiment.

The master BMS 10 includes a control module 101 and a wireless communication module 102. The master BMS receives the information for at least one of a battery pack current, battery pack voltage, and battery pack temperature along with a plurality of battery cell voltages 10 from each of a plurality of slaves BMS 111, 121, 131, 141, 151, and 161. The information received through the wireless communication module 102 is transferred to the control module 101.

A CAN bus line 5 is connected between the control module 101 and the electronic control units ECU1 and ECU2, so that the control module 101 and the electronic control units ECU1 and ECU2 may transmit and receive the necessary information through the CAN communication. For example, the electronic control unit ECU1 may transmit a signal requesting power supply to the control module 101 through the CAN communication in order to receive the power required for driving the vehicle. In addition, the control module 101 may transmit charging control information to the electronic control unit ECU1 through the CAN communication to control the charging. In addition, the control module 101 requests the information about the current position of the vehicle and the current road condition of the vehicle position (hereinafter, road condition information) to the electronic control unit ECU2, and may transmit the current vehicle position and the road condition information from the electronic control unit ECU2 via the CAN communication to the control module 101 via the CAN communication. The road condition information may include information indicating whether the road of the current position of the vehicle corresponds to a high speed road, an uphill road, a downhill road, a parking lot, a child protection area, near a destination, a low speed limit section, etc.

The control module 101 may differently adjust the failure confirmation time for determining whether a wireless communication failure occurs based on the road condition information. For example, the failure confirmation time is set as the first section for the road condition that may cause an over/low voltage of the cell, and the failure confirmation time is set as the second section for the road condition that does not affect the battery cell. In this case, the first section is shorter than the second section. That is, in the road condition in which the cell does not cause the overvoltage or the low voltage, the control module 101 may set the failure confirmation time to be longer to secure the RF communication restore time without entering the safety mode. Then, the frequent safety mode entry may be prevented.

The control module 101 may control the charge operation and the discharge operation of each of a plurality of battery packs 11 to 16 based on a plurality of cell voltages, the battery pack current, and the battery pack temperature received from each of a plurality of slave BMS 111, 121, 131, 141, 151, and 161. For example, the control module 101 may control the opening of the relay 114 based on a plurality of cell voltages received during the charging or the discharging, and transmit a control signal for opening the relay 114 of a specific battery pack 11 to 16 among a plurality of battery packs 11 to 16 to the slave BMS.

In addition, the control module 101 may detect the cell in which a cell balancing is requested based on a plurality of received cell voltages, and transmit a signal for controlling the cell balancing to the slave BMS of the battery pack including the corresponding cell.

The control module 101 may determine whether the wireless communication failure has occurred on the basis of the signal received through the wireless communication module 102. A method for determining the wireless communication failure may be implemented by one of various known techniques. For example, if the wireless communication failure is maintained during the failure confirmation time, the control module 101 puts the master BMS 10 into the safety mode. Depending on the safety mode, the control module 101 generates the relay control signal to open the relays 17 and 18.

Hereinafter, a failure confirmation time control method according to an exemplary embodiment is described with reference to FIG. 4.

Figure 4:
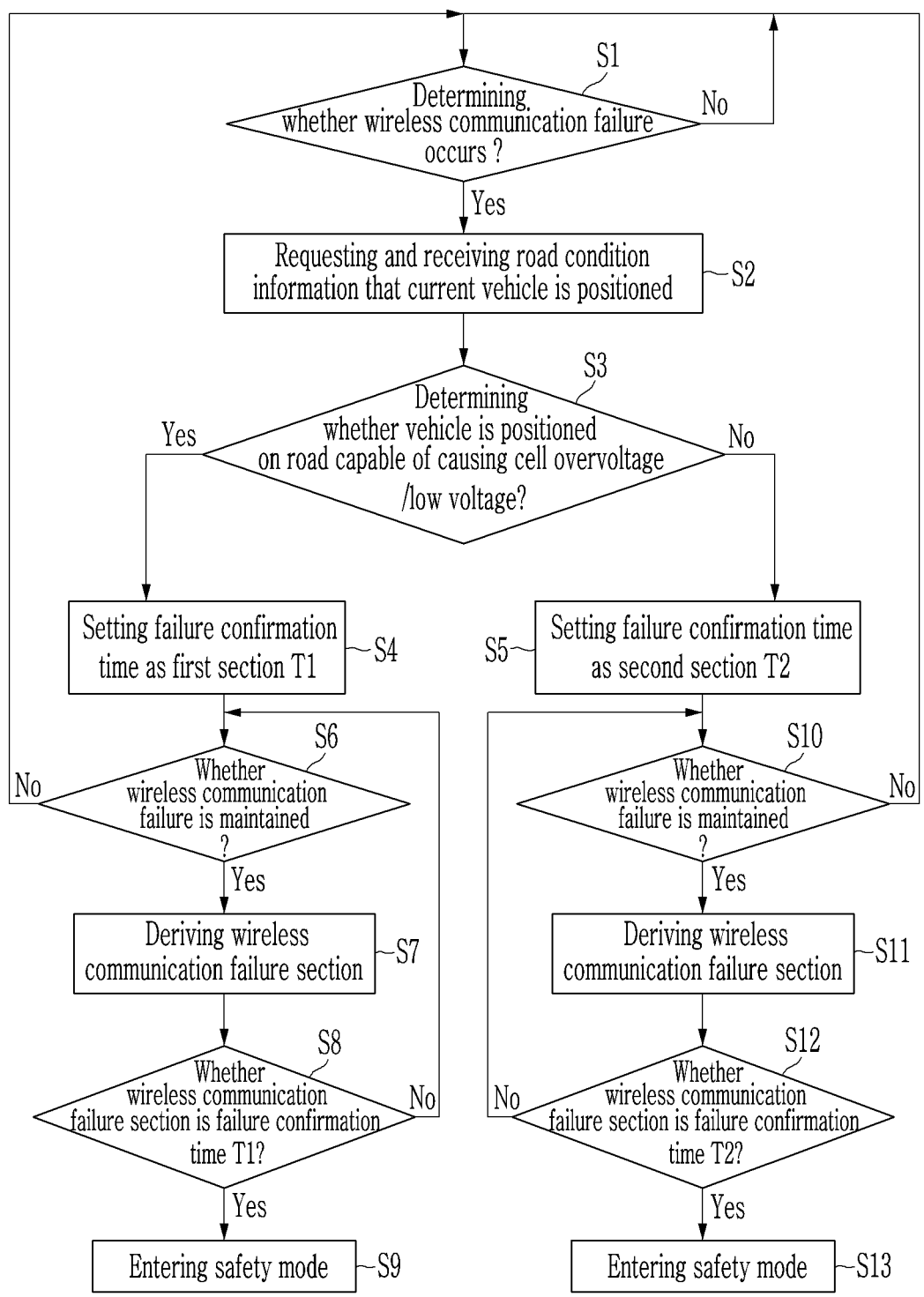
FIG. 4 is a view showing a failure confirmation time control method according to an exemplary embodiment.

FIG. 4 is a view showing a failure confirmation time control method according to an exemplary embodiment.

The control module 101 determines whether a failure has occurred in the wireless communication between the master BMS 10 and at least one of a plurality of slave BMS 111, 121, 131, 141, 151, and 161 (S10). As the determination result of the step S1, if the wireless communication failure does not occur, the control module 101 may periodically repeat the step (S1).

As the determination result of the step (S1), if the wireless communication failure occurs, the control module 101 requests the road condition information where the vehicle is currently positioned from the electronic control unit ECU2 to receive the corresponding information (S2).

The control module 101 determines whether the overvoltage/low voltage of the cell may be caused on the road based on the road condition information where the vehicle is currently positioned (S3). For example, if the road condition information is any one of a high speed, an uphill, a downhill, etc., the control module 101 determines that the current position of the vehicle is located on the road capable of causing the over-voltage/low voltage.

As a result of the determination of the step (S3), if the current position of the vehicle is located on the road capable of causing the overvoltage/low voltage of the cell, the control module 101 sets the failure confirmation time as the first section T1 (S4). As a result of the determination of the step (S3), if the current position of the vehicle is not on the road capable of causing the overvoltage/low voltage of the cell, the control module 101 sets the failure confirmation time as the second section T2 (S5). The second section is longer than the first section.

Following the step (S4), the control module 101 determines whether the wireless communication failure is maintained (S6).

As a result of the determination of the step (S6), if the wireless communication failure is maintained, the control module 101 derives a wireless communication failure section from the time when the wireless communication failure occurs to the current time (S7). The control module 101 may count the passage of the time.

The control module 101 compares the wireless communication failure section with the failure confirmation time T1 predetermined in the step (S4) (S8).

As a result of the determination of the step (S8), if the wireless communication failure section reaches the failure confirmation time T1, the control module 101 enters the safety mode (S9). Depending on the safety mode, the control module 101 may open the relay.

As a result of the determination of the step (S8), if the wireless communication failure section does not reach the failure confirmation time T1, the control module 101 repeats from the step (S6).

As a result of the determination of the step (S6), if the wireless communication failure is not maintained, the control module 101 may periodically repeat the step (S1) again.

Following the step (S5), the control module 101 determines whether the wireless communication failure is maintained (S10).

As a result of the determination of the step (S10), if the wireless communication failure is maintained, the control module 101 derives a wireless communication failure section from the time when the wireless communication failure occurs to the current time (S11). The control module 101 may count the passage of the time.

The control module 101 compares the wireless communication failure section with the failure confirmation time T2 predetermined in the step (S5) (S12).

As a result of the determination of the step (S12), if the wireless communication failure section reaches the failure confirmation time T2, the control module 101 enters the safety mode (S13). Depending on the safety mode, the control module 101 may open the relay.

As a result of the determination of the step (S12), if the wireless communication failure section does not reach the failure confirmation time T2, the control module 101 repeats from the step (S10).

As a result of the determination of the step (S10), if the wireless communication failure is not maintained, the control module 101 may periodically repeat the step (S1) again.

As such, according to an exemplary embodiment, by differently controlling the failure confirmation time for determining whether the wireless communication failure occurs based on the current position of the vehicle, the stability and marketability of the battery system may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A management method of a battery system including a plurality of battery packs, a plurality of slave battery management systems (BMSs), and a master battery management system (BMS) connected to the plurality of slave BMSs by wireless communication, comprising:
    determining whether a wireless communication failure occurs between the master BMS and at least one of the plurality of slave BMSs;
    receiving road condition information where a vehicle equipped with the battery system is currently positioned if the wireless communication failure occurs;
    determining whether the vehicle is on a road capable of causing a cell overvoltage/low voltage based on the road condition information;
    setting a first failure confirmation time if a current position of the vehicle is on the road capable of causing the cell overvoltage/low voltage;
    setting a second failure confirmation time if the current position of the vehicle is not located on the road capable of causing the cell overvoltage/low voltage; and
    entering a safety mode if a wireless communication failure section from a time when the wireless communication failure occurs to a current time reaches the first failure confirmation time or the second failure confirmation time,
    wherein the second failure confirmation time is longer than the first failure confirmation time.

2. The battery management method of claim 1, wherein the determining whether the vehicle is on the road capable of causing the cell overvoltage/low voltage based on the road condition information includes
    determining that the current position of the vehicle is on the road capable of causing the cell overvoltage/low voltage when the road condition information is any one of a high speed, an uphill road, and a downhill road.

3. The battery management method of claim 1, further comprising
    deriving the wireless communication failure section from the time when the wireless communication failure occurs to the current time.

4. The battery management method of claim 1, further comprising
    determining whether the wireless communication failure is maintained if the wireless communication failure section does not reach the first failure confirmation time when the current position of the vehicle is on the road capable of causing the cell overvoltage/low voltage.

5. The battery management method of claim 1, further comprising
    determining whether the wireless communication failure is maintained if the wireless communication failure section does not reach the second failure confirmation time when the current position of the vehicle is not positioned on the road capable of causing the cell overvoltage/low voltage.

6. The battery management method of claim 1, further comprising
opening a relay between the vehicle and the battery system depending on the safety mode.

7. The battery management method of claim 1, wherein the plurality of battery packs are connected in parallel.

8. The battery management method of claim 1, wherein the plurality of battery packs include six battery packs.

9. A battery system comprising:
a battery pack including a plurality of battery cells and slave battery management systems (BMSs);
a master battery management system (BMS) connected to the slave BMSs by wireless communication; and
at least one relay connected between a vehicle and the battery pack,
wherein the master BMS, if a failure occurs in wireless communication with the slave BMSs, is configured to:
receive road condition information for which the vehicle is currently positioned,
determine whether the vehicle is on a road capable of causing a cell overvoltage/low voltage based on the road condition information,
set a first failure confirmation time if a current position of the vehicle is positioned on the road capable of causing the cell overvoltage/low voltage,
set a second failure confirmation time if the current position of the vehicle is not on the road capable of causing the cell overvoltage/low voltage, and
enter a safety mode if a wireless communication failure section from a time when the wireless communication failure occurs to a current time reaches the first failure confirmation time or the second failure confirmation time, and
wherein the second failure confirmation time is longer than the first failure confirmation time.

10. The battery system of claim 9, wherein
the master BMS is configured to determine that the current position of the vehicle is on the road capable of causing the cell overvoltage/low voltage when the road condition information is any one of a high speed, an uphill, or a downhill.

11. The battery system of claim 9, wherein
the master BMS is configured to derive the wireless communication failure section from the time when the wireless communication failure occurs to the current time.

12. The battery system of claim 9, wherein
the master BMS is configured to determine whether the wireless communication failure is maintained if the wireless communication failure section does not reach the first failure confirmation time when the current position of the vehicle is on the road capable of causing the cell overvoltage/low voltage.

13. The battery system of claim 9, wherein
the master BMS is configured to determine whether the wireless communication failure is maintained if the wireless communication failure section does not reach the first failure confirmation time when the current position of the vehicle is not on the road capable of causing the cell overvoltage/low voltage.

14. The battery system of claim 9, wherein
the master BMS is configured to open the at least one relay based on the safety mode.

15. The battery system of claim 9, wherein the at least one relay comprises:
a first relay connected to a positive terminal of the battery pack; and
a second relay connected to a negative terminal of the battery pack.

16. The battery system of claim 15, wherein each of the first relay and the second relay is connected to the vehicle and configured to be controlled by the master BMS.

17. The battery system of claim 9, further comprising a navigation device connected to the master BMS.

* * * * *